United States Patent
Schmidt et al.

(10) Patent No.: US 9,410,621 B2
(45) Date of Patent: Aug. 9, 2016

(54) METHOD FOR OPERATING AN AUTOMATIC TRANSMISSION IN A LIMP MODE

(71) Applicant: ZF Friedrichshafen AG, Friedrichshafen (DE)

(72) Inventors: Andreas Schmidt, Bavendorf (DE); Ruben Cueppers, Wangen (DE); Max Trautwein, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 2 days.

(21) Appl. No.: 14/512,519

(22) Filed: Oct. 13, 2014

(65) Prior Publication Data
US 2016/0102759 A1    Apr. 14, 2016

(51) Int. Cl.
| | |
|---|---|
| *F16H 3/62* | (2006.01) |
| *F16H 61/686* | (2006.01) |
| *F16H 61/12* | (2010.01) |
| *B60W 10/02* | (2006.01) |
| *F16H 61/04* | (2006.01) |

(52) U.S. Cl.
CPC ............ *F16H 61/12* (2013.01); *F16H 61/0403* (2013.01); *F16H 2061/0411* (2013.01); *F16H 2061/1224* (2013.01); *F16H 2061/1284* (2013.01); *F16H 2200/0065* (2013.01); *F16H 2200/2012* (2013.01); *F16H 2200/2046* (2013.01); *F16H 2200/2064* (2013.01)

(58) Field of Classification Search
CPC ................... F16H 61/0403; F16H 2061/0411; F16H 61/08
See application file for complete search history.

(56) References Cited

U.S. PATENT DOCUMENTS

| | | | | |
|---|---|---|---|---|
| 2004/0116249 A1* | 6/2004 | Kayano | .................... | F16H 3/12 477/109 |
| 2011/0263382 A1* | 10/2011 | Arnold | ................ | F16H 61/0403 477/121 |
| 2012/0022752 A1* | 1/2012 | Arnold | ................ | F16H 61/0437 701/54 |
| 2012/0283064 A1* | 11/2012 | Herbeth | .................. | F16H 61/04 475/275 |

\* cited by examiner

*Primary Examiner* — Sherry Estremsky
*Assistant Examiner* — Lillian Nguyen
(74) *Attorney, Agent, or Firm* — Dority & Manning, P.A.

(57) ABSTRACT

The present subject matter provides a method for operating an automatic transmission in a limp mode. The method includes actuating a first non-positive shifting element to an engaged configuration and actuating a second non-positive shifting element to the engaged configuration. A positive shifting element is substantially synchronized after actuating the second non-positive shifting element. The method also includes commanding the positive shifting element to actuate from a disengaged configuration to the engaged configuration.

16 Claims, 4 Drawing Sheets

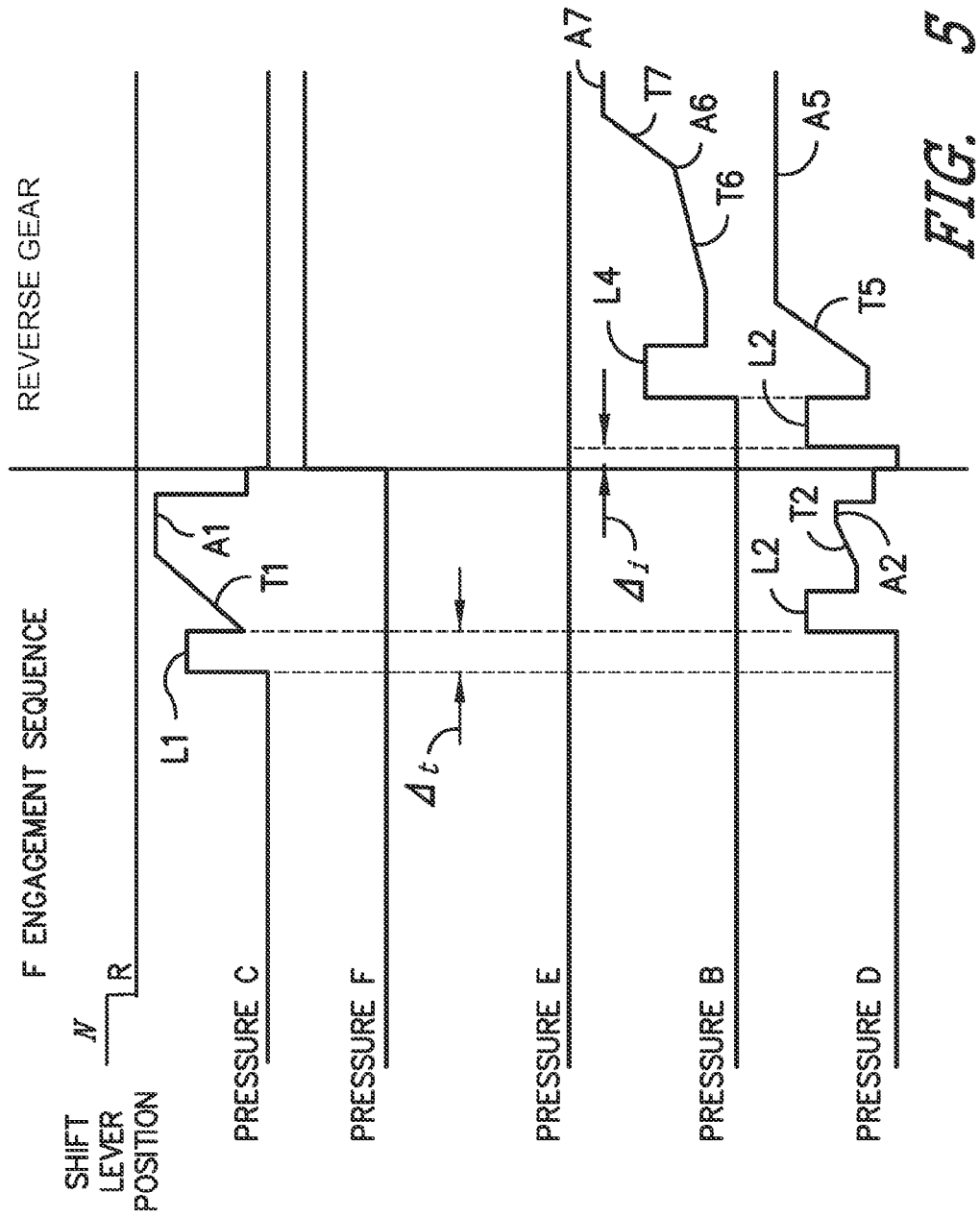

METHOD FOR OPERATING AN AUTOMATIC TRANSMISSION IN A LIMP MODE

FIELD OF THE INVENTION

The present subject matter relates generally to automatic transmissions, such as nine-speed automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Certain automatic transmissions include dog clutch shifting elements. During various gear shifts, the dog clutch is engaged or closed. Engaging the dog poses certain challenges. For example, the dog clutch is generally synchronized prior to engaging the dog clutch. When the dog clutch is synchronized, components of the dog clutch rotate at a common speed and may engage each other more easily. Conversely, such components may grind against each other and be damaged if the dog clutch is engaged while the dog clutch is not synchronized. However, synchronizing the dog clutch can be difficult and/or time consuming. In particular, synchronizing the dog clutch during a controller area network (CAN) or a transmission control unit (TCU) sensor failure poses certain challenges. During failure of such components, the automatic transmission is generally operating in a limp mode, and synchronizing the dog clutch when the automatic transmission is operating in a limp mode can be difficult.

Accordingly, a method for synchronizing a dog clutch of an automatic transmission would be useful. In particular, a method for synchronizing a dog clutch of an automatic transmission when the automatic transmission is operating in a limp mode would be useful.

BRIEF DESCRIPTION OF THE INVENTION

The present subject matter provides a method for operating an automatic transmission in a limp mode. The method includes actuating a first non-positive shifting element to an engaged configuration and actuating a second non-positive shifting element to the engaged configuration. A positive shifting element is substantially synchronized after actuating the second non-positive shifting element. The method also includes commanding the positive shifting element to actuate from a disengaged configuration to the engaged configuration. Additional aspects and advantages of the invention will be set forth in part in the following description, or may be apparent from the description, or may be learned through practice of the invention.

In a first exemplary embodiment, a method for operating an automatic transmission in a limp mode is provided. The automatic transmission has a plurality of non-positive shifting elements and at least one positive shifting element. The method includes actuating a first one of the plurality of non-positive shifting elements to an engaged configuration and actuating a second one of the plurality of non-positive shifting elements to the engaged configuration. The step of actuating the second one of the plurality of non-positive shifting elements is initiated after a start of the step of actuating the first one of the plurality of non-positive shifting elements. A first one of the at least one positive shifting element is substantially synchronized after the step of actuating the second one of the plurality of non-positive shifting elements. The method also includes commanding the first one of the at least one positive shifting element to actuate from a disengaged configuration to the engaged configuration after the step of actuating the second one of the plurality of non-positive shifting elements.

In a second exemplary embodiment, a method for operating a nine-speed automatic transmission in a limp mode is provided. The nine-speed automatic transmission has a plurality of non-positive shifting elements and a pair of positive shifting elements. The method includes actuating an element C of the plurality of non-positive shifting elements to an engaged configuration and actuating an element D of the plurality of non-positive shifting elements to the engaged configuration. The step of actuating the element D is initiated after a start of the step of actuating the element C. An element F of the pair of positive shifting elements is substantially synchronized after the step of actuating the element D. The method also includes commanding the element F to actuate from a disengaged configuration to the engaged configuration after the step of actuating the element D.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIGS. 4 and 5 illustrate plots of shifting element actuation for the exemplary automatic transmission of FIG. 1 during the exemplary method of FIG. 3.

DETAILED DESCRIPTION

Figures 1, 2:
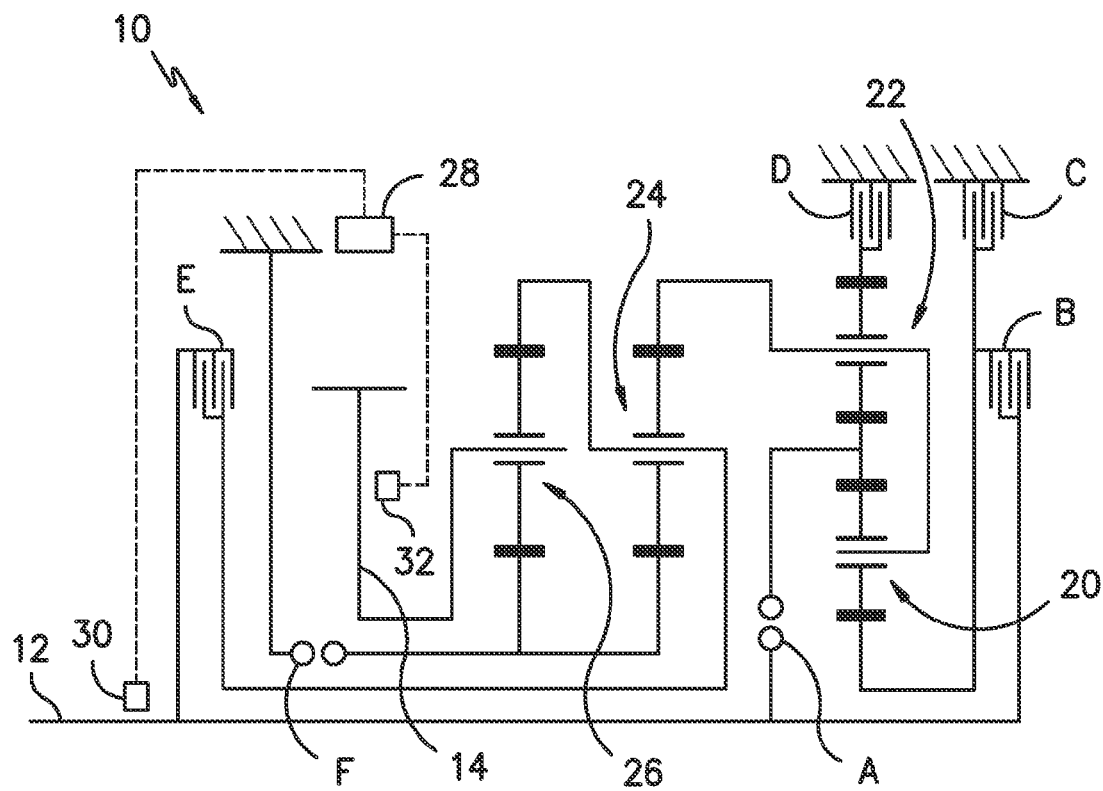
FIG. 1 provides a schematic view of an automatic transmission according to an exemplary embodiment of the present subject matter.
FIG. 2 illustrates a table of an exemplary shifting scheme as may be used with the exemplary automatic transmission of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to a motor of an associated vehicle. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or a turbine of an associated torque coupling. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc.

Figure 3:
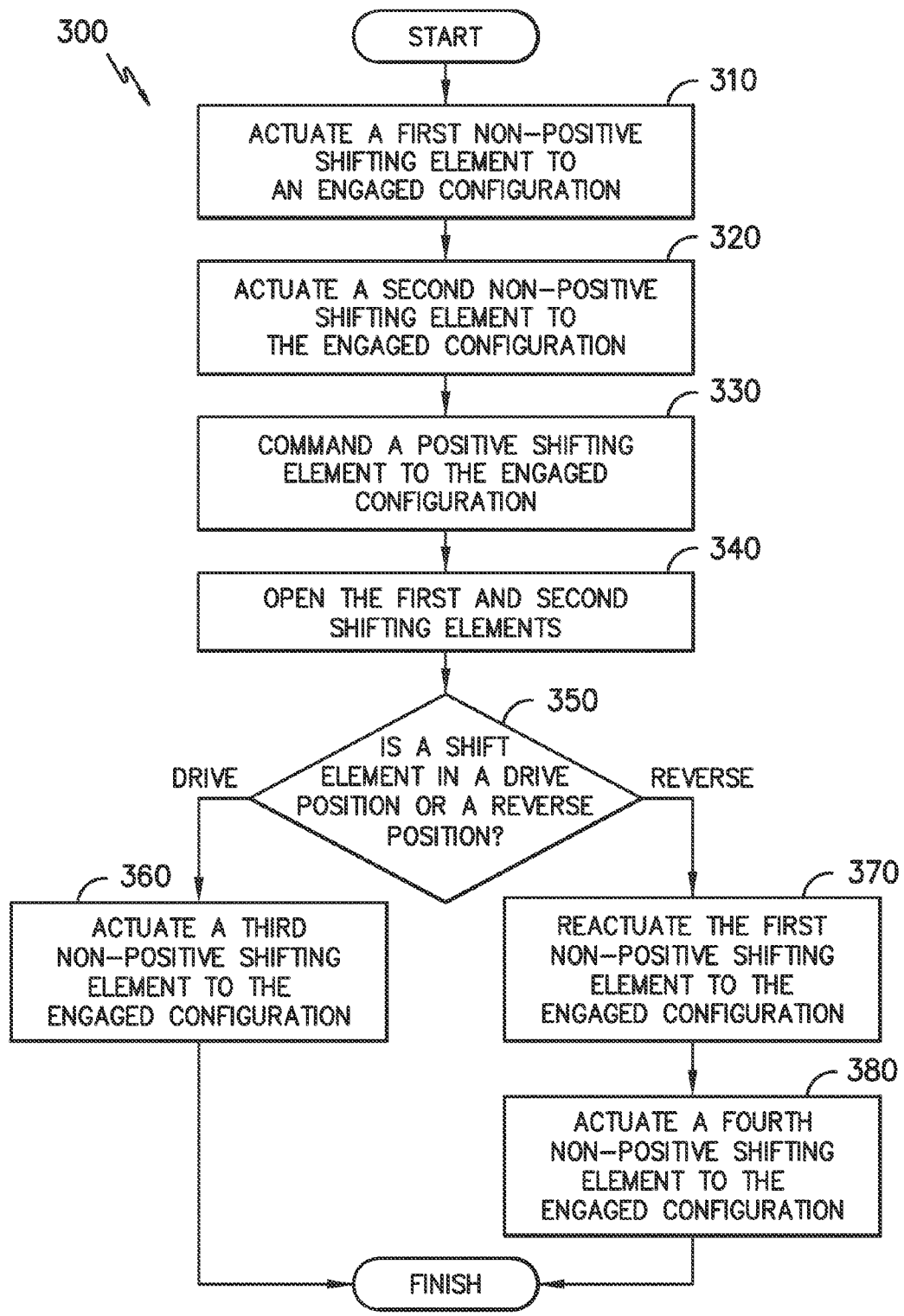
FIG. 3 illustrates a method for operating an automatic transmission according to an exemplary embodiment of the present subject matter.

FIG. 3 illustrates a method 300 for operating an automatic transmission according to an exemplary embodiment of the present subject matter. Method 300 may be used in or with any suitable transmission. For example, method 300 may be used with automatic transmission 10 (FIG. 1). The electronic control unit 28 of automatic transmission 10 may be programmed or configured to implement method 300. Utilizing method 300, a positive shifting element of automatic transmission 10, such as dog clutch F or dog clutch A, may be synchronized and engaged, e.g., when automatic transmission 10 is operating in a limp mode.

Figure 4:
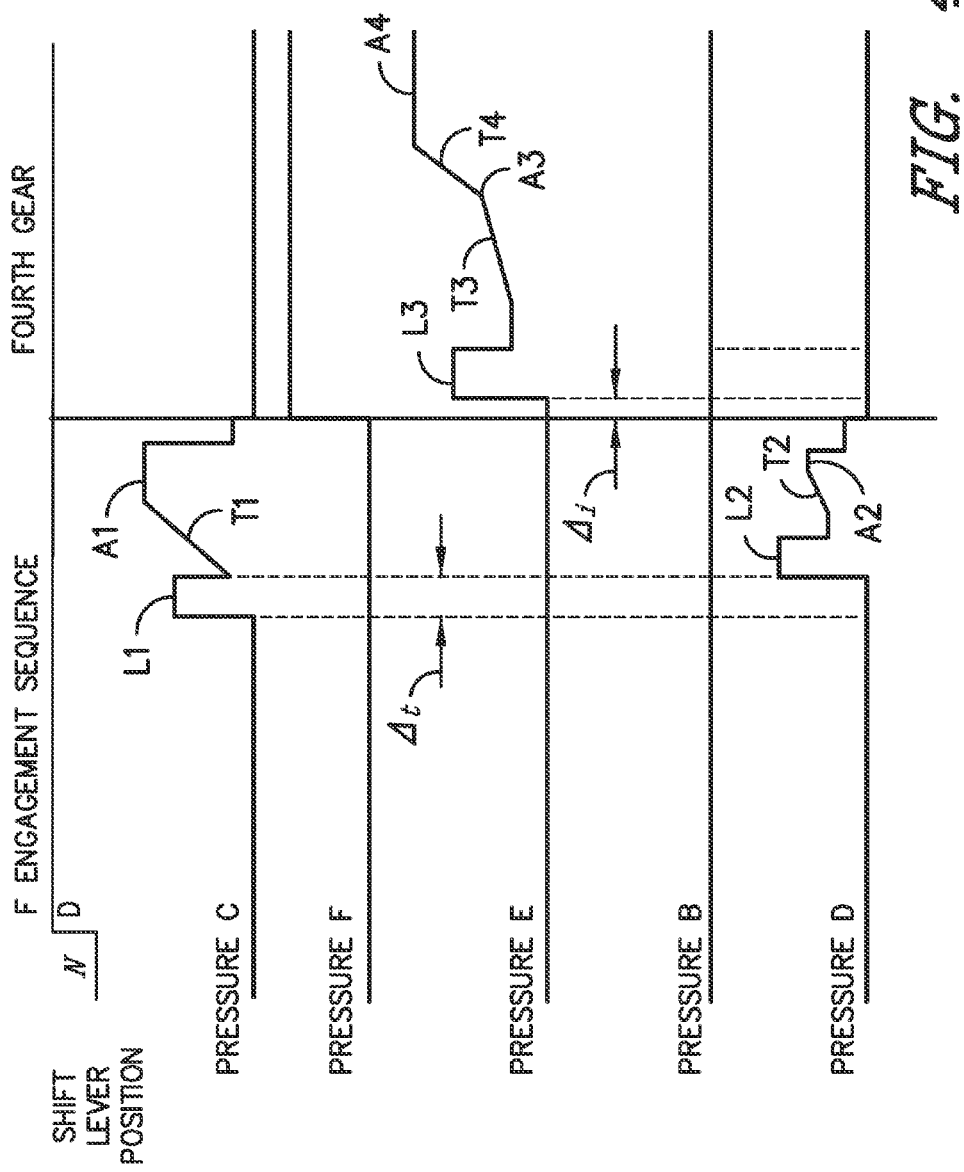

FIGS. 4 and 5 illustrate plots of shifting element actuation for automatic transmission 10 during method 300. FIG. 4 provides a plot of shifting element actuation, including actuation of dog clutch F, with automatic transmission 10 operating in limp mode and a shift lever of an associated vehicle positioned in a forward gear, such as a drive ("D") position. FIG. 5 provides a plot of shifting element actuation, including actuation of dog clutch F, with automatic transmission 10 operating in limp mode and a shift lever of an associated vehicle positioned in a reverse gear, such as a reverse ("R") position. Method 300 is described in greater detail below with reference to FIGS. 4 and 5.

In FIGS. 4 and 5, lines labeled "pressure C", "pressure F", "pressure E", "pressure B" and "pressure D" correspond to a command pressure supplied to multidisc brake C, dog clutch F, multidisc clutch E, multidisc clutch B and multidisc brake D, respectively. Electronic control unit 28 may selectively adjust the command pressure to multidisc brake C, dog clutch F, multidisc clutch E, multidisc clutch B and multidisc brake D as shown in FIGS. 4 and 5, e.g., by selectively opening and closing the associated solenoid valves of the shifting elements. The line labeled "shift lever position" corresponds to a position of a shift lever associated with automatic transmission 10. The upper position shown in FIG. 4 corresponds to a position of the shift lever when the shift lever is positioned in the D (drive) position. The middle position shown in FIGS. 4 and 5 corresponds to a position of the shift lever where automatic transmission 10 is not delivering power to output shaft 14, e.g., when the shift lever is positioned in N (neutral) position or the P (park) position. The lower position shown in FIG. 5 corresponds to a position of the shift lever when the shift lever is positioned in the R (reverse) position. The time period labeled "F engagement sequence" corresponds to a period of time when dog clutch F is synchronized in order to permit actuation of dog clutch F from the disengaged configuration to the engaged configuration while automatic transmission 10 is operated in the limp mode. The time period labeled "fourth gear" in FIG. 4 corresponds to a period of time when automatic transmission 10 is operated in fourth gear after synchronizing and closing dog clutch F in the limp mode. The time period labeled "reverse gear" in FIG. 4 corresponds to a period of time when automatic transmission 10 is operated in reverse gear after synchronizing and closing dog clutch F in the limp mode.

Prior to step 310, automatic transmission 10 enters the limp mode. The limp mode allows automatic transmission 10 to operate and provide power to output shaft 14, e.g., despite malfunctions of certain components of features of automatic transmission 10. The limp mode thus allows a user of an associated vehicle to drive the associated vehicle while automatic transmission 10 is not working properly. While operating in the limp mode, the speed of output shaft 14 and other operating parameters of automatic transmission 10 may be limited or automatic transmission 10 may only operate in certain gears, e.g., in order avoid or limit damage to automatic transmission 10, as will be understood by those skilled in the art. In the limp mode, the pressure supplied to the shifting elements of automatic transmission 10 may be increased in order to avoid or limit damage to the shifting elements, as will be understood by those skilled in the art.

At step 310, a first non-positive shifting element of automatic transmission 10 is shifted to the engaged configuration. As an example, multidisc brake C may be closed at step 310, as may be seen in FIGS. 4 and 5. Electronic control unit 28 may open a solenoid valve of multidisc brake C in order to close multidisc brake C at step 310. In particular, as may be seen in FIGS. 4 and 5, electronic control unit 28 may first open the solenoid valve of multidisc brake C to a first position by pulsing the current supplied to multidisc brake C to a first level L1, e.g., in order to fill any void(s) within a line to multidisc brake C with fluid. Electronic control unit 28 may then decrease the current supplied to the solenoid valve of multidisc brake C and increase the current supplied to the solenoid valve of multidisc brake C along a first actuating trajectory T1 until the current supplied to the solenoid valve of multidisc brake C reaches a first actuation value A1 and the multidisc brake C is in the actuated configuration. In such a manner, multidisc brake C may be closed at step 310.

At step 320, a second non-positive shifting element of automatic transmission 10 is shifted to the engaged configuration or a touch point of the second non-positive shifting element. As an example, multidisc brake D may be closed or brought to the engaged configuration at step 320, as may be seen in FIGS. 4 and 5. Electronic control unit 28 may open a solenoid valve of multidisc brake D in order to close multidisc brake D and bring multidisc brake D to the engaged configuration at step 320. In particular, as may be seen in FIGS. 4 and 5, electronic control unit 28 may first open the solenoid valve of multidisc brake D to a first position by pulsing the current supplied to multidisc brake D to a second level L2, e.g., in order to fill any void(s) within a line to multidisc brake D with fluid. Electronic control unit 28 may then decrease the current supplied to the solenoid valve of multidisc brake D and increase the current supplied to the solenoid valve of multidisc brake D along a second actuating trajectory T2 until the current supplied to the solenoid valve of multidisc brake D reaches a second actuation value A2 and the multidisc brake D is positioned in the engaged configuration. In such a manner, multidisc brake D may be brought to the engaged configuration at step 320.

Step 320 may be started or initiated after a start of step 310. Thus, as an example, electronic control unit 28 may pulse the current supplied to multidisc brake C at step 310 prior to pulsing the current supplied to multidisc brake D at step 320. In particular, a time period, Δt, may be provided between a start of step 310 and a start step 320. The time period Δt may be any suitable time interval. For example, the time period Δt may be selected such that a speed differential of the dog clutch F is reduced during step 320. Thus, the time period Δt may be selected in order to minimize the speed differential of the dog clutch E during step 320. The time period Δt may be determined during manufacture or testing of automatic transmission 10. Thus, the time period Δt may be determined empirically.

Steps 310 and 320 may assist with reducing a speed differential between rotating components of the positive shifting element of automatic transmission 10. For example, steps 310 and 320 may assist with reducing a speed differential between rotating components of dog clutch F. Thus, steps 310 and 320 may assist with synchronizing dog clutch F in order to assist with actuating dog clutch F from the disengaged configuration to the engaged configuration while automatic transmission 10 is operating the limp mode. In particular, by closing multidisc brake C and multidisc brake D to the engaged configuration at predefined time intervals, dog clutch F may be synchronized and actuated to the engaged configuration without relying upon sensor feedback. In such a manner, dog clutch F may be substantially synchronized after step 320 in order to permit actuation of dog clutch F to the closed configuration while automatic transmission 10 is operating in the limp mode.

At step 330, a positive shifting element of automatic transmission 10 is commanded to close or actuate from the disengaged configuration to the engaged configuration. As an example, dog clutch F may be commanded to actuate to from the disengaged configuration to the engaged configuration at step 330, e.g., after dog clutch F is synchronized during steps 310 and 320. In particular, electronic control unit 28 may open a solenoid valve of dog clutch F such that a command line pressure supplied to dog clutch F is increased in order to command dog clutch F to adjust to the engaged configuration at step 330, as shown in FIGS. 4 and 5.

At step 340, the first and second non-positive shifting elements of automatic transmission 10 are opened or shifted to the disengaged configuration, e.g., after dog clutch F is engaged. For example, multidisc brake C and multidisc brake D may be opened at step 340. Electronic control unit 28 may close solenoid valves of multidisc brake C and multidisc brake D in order to open multidisc brake C and multidisc brake D at step 340. Thus, after step 340, only dog clutch F of automatic transmission 10 may be in the engaged configuration, and power delivery to output shaft 14 of automatic transmission 10 may be interrupted or terminated.

At step 350, a position of a shift lever associated with automatic transmission 10 is determined or established. At step 360, a third non-positive shifting element of automatic transmission 10 may be closed or shifted to the engaged configuration if the shift lever is in a drive ("D") position at step 350. For example, multidisc clutch E may be closed or shifted to the engaged configuration if the shift lever is in the drive ("D") position at step 350. Electronic control unit 28 may open a solenoid valve of multidisc clutch E in order to close multidisc clutch E at step 360. In particular, as may be seen in FIG. 4, electronic control unit 28 may first open the solenoid valve of multidisc clutch E to a first position by pulsing the current supplied to multidisc clutch E to a third level L3, e.g., in order to fill any void(s) within a line to multidisc clutch E with fluid. Electronic control unit 28 may then decrease the current supplied to the solenoid valve of multidisc clutch E and increase the current supplied to the solenoid valve of multidisc clutch E along a third actuating trajectory T3 until the current supplied to the solenoid valve of multidisc clutch E reaches a first touching value A3 and the multidisc clutch E is positioned at the touch point of multidisc clutch E. In such a manner, multidisc clutch E may be brought to the touch point of multidisc clutch E at step 360. The first touching value A3 may be less than a pressure required to actuate multidisc clutch E to the engaged configuration. With multidisc clutch E at the touch point of multidisc clutch E, electronic control unit 28 may increase the current supplied to the solenoid valve of multidisc clutch E along a fourth actuating trajectory T4 until the current supplied to the solenoid valve of multidisc clutch E reaches a third actuation value A4 and the multidisc clutch E is in the actuated configuration. In such a manner, multidisc clutch E may be closed at step 360.

By actuating multidisc clutch E to the engaged configuration at step 360, automatic transmission 10 is shifted to fourth gear, as may be seen in FIG. 2. Thus, method 300 may assist with synchronizing dog clutch F and closing multidisc clutch E when automatic transmission 10 is operating in the limp mode. In such a manner, automatic transmission 10 may be shifted to fourth gear while automatic transmission 10 is in the limp mode, and a driver of an associated vehicle may drive the associated vehicle to a repair shop or off a roadway while the automatic transmission 10 is operating in fourth gear and the limp mode. Method 300 may be performed without sensor feedback and may rely upon timing between consecutive steps of method 300 in order to permit operation of automatic transmission 10 in the limp mode. It should be understood that automatic transmission 10 may be shifted to any suitable forward gear in the limp mode during method 300. Thus, method 300 is not limited to operating automatic transmission 10 in fourth gear in the limp mode.

As may be seen in FIG. 4, a time interval, Δi, may be provided between a start of step 360 (or step 370) and, e.g., an end of, step 330. Dog clutch F actuates from the disengaged configuration to the engaged configuration during the time interval Δi. The time interval Δi may be any suitable time interval. For example, the time interval Δi may be selected such that sufficient time is provided for couplings of dog clutch F to engage each other under fluid pressure. The time interval Δi may be determined during manufacture or testing of automatic transmission 10. Thus, the time interval Δi may be determined empirically.

Turning now to FIG. 5, automatic transmission 10 may also be shifted to the reverse gear in the limp mode during method 300. At step 370, the second non-positive shifting element of automatic transmission 10 is closed or shifted to the engaged configuration if the shift lever is in a reverse ("R") position at step 350. For example, multidisc brake D may be closed or shifted to the engaged configuration if the shift lever is in the reverse ("R") position at step 350. Electronic control unit 28 may open the solenoid valve of multidisc brake D in order to close multidisc brake D at step 370. In particular, as may be seen in FIG. 5, electronic control unit 28 may first open the solenoid valve of multidisc brake D to the first position by pulsing the current supplied to multidisc brake D to the second level L2. Electronic control unit 28 may then decrease the current supplied to the solenoid valve of multidisc brake D and increase the current supplied to the solenoid valve of multidisc brake D along a fifth actuating trajectory T5 until the current supplied to the solenoid valve of multidisc brake D reaches a fourth actuation value A5 and the multidisc brake D is in the actuated configuration. In such a manner, multidisc brake D may be closed at step 370.

At step 380, a fourth non-positive shifting element of automatic transmission 10 is closed or shifted to the engaged configuration if the shift lever is in a reverse ("R") position at step 350. For example, multidisc clutch B may be closed or shifted to the engaged configuration if the shift lever is in the reverse ("R") position at step 350. Electronic control unit 28 may open the solenoid valve of multidisc clutch B in order to close multidisc clutch B at step 380. In particular, as may be seen in FIG. 5, electronic control unit 28 may first open the solenoid valve of multidisc clutch B to a first position by pulsing the current supplied to multidisc clutch B to a fourth level L4. Electronic control unit 28 may then decrease the current supplied to the solenoid valve of multidisc clutch B and increase the current supplied to the solenoid valve of multidisc clutch B along a sixth actuating trajectory T6 until the current supplied to the solenoid valve of multidisc clutch B reaches a second touching value A6 and the multidisc clutch B is positioned at the touch point of multidisc clutch B. In such a manner, multidisc clutch B may be brought to the touch point of multidisc clutch B at step 380. The second touching value A6 may be less than a pressure required to actuate multidisc clutch B to the engaged configuration. With multidisc clutch B at the touch point of multidisc clutch B, electronic control unit 28 may increase the current supplied to the solenoid valve of multidisc clutch B along a seventh actuating trajectory T7 until the current supplied to the solenoid valve of multidisc clutch B reaches a fifth actuation value A7 and the multidisc clutch B is in the actuated configuration. In such a manner, multidisc clutch B may be closed at step 380.

By actuating multidisc brake D to the engaged configuration at step 370 and multidisc clutch B to the engaged configuration at step 380, automatic transmission 10 is shifted to reverse gear, as may be seen in FIG. 2. Thus, method 300 may assist with synchronizing dog clutch F and closing multidisc brake D and multidisc clutch B when automatic transmission 10 is operating in the limp mode. In such a manner, automatic transmission 10 may be shifted to reverse gear while automatic transmission 10 is in the limp mode, and a driver of an associated vehicle may drive the associated vehicle to a repair shop or off a roadway while the automatic transmission 10 is operating in reverse gear and the limp mode. Method 300 may be performed without sensor feedback and may rely upon timing between consecutive steps of method 300 in order to permit operation of automatic transmission 10 in the limp mode.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an automatic transmission in a limp mode, the automatic transmission having a plurality of non-positive shifting elements and at least one positive shifting element, the method comprising;
    actuating a first one of the plurality of non-positive shifting elements to an engaged configuration;
    actuating a second one of the plurality of non-positive shifting elements to the engaged configuration, said step of actuating the second one of the plurality of non-positive shifting elements being initiated after a start of said step of actuating the first one of the plurality of non-positive shifting elements, a first one of the at least one positive shifting element being substantially synchronized after said step of actuating the second one of the plurality of non-positive shifting elements;
    commanding the first one of the at least one positive shifting element to actuate from a disengaged configuration to the engaged configuration after said step of actuating the second one of the plurality of non-positive shifting elements;
    opening the first one and the second one of the plurality of non-positive shifting elements after said step of commanding; and
    actuating a third one of the plurality of non-positive shifting elements to the engaged configuration after said step of commanding,
    wherein a time interval, $\Delta i$, is provided between a start step of actuating the third one of the plurality of non-positive shifting elements and step of commanding, the first one of the at least positive shifting element actuating from the disengaged configuration to the engaged configuration during the time interval $\Delta i$.

2. The method of claim 1, wherein a time period, $\Delta t$, is provided between a start of said step of actuating the second one of the plurality of non-positive shifting elements and the start of said step of actuating the first one of the plurality of non-positive shifting elements, the time period $\Delta t$ selected such that a speed differential of the first one of the at least one positive shifting element is reduced during said step of actuating the second one of the plurality of non-positive shifting elements.

3. The method of claim 2, wherein the time period $\Delta t$ is selected in order to minimize the speed differential of the first one of the at least one positive shifting element during said step of actuating the second one of the plurality of non-positive shifting elements.

4. The method of claim 1, wherein the automatic transmission is in a forward gearing after said step of actuating the third one of the plurality of non-positive shifting elements.

5. The method of claim 1, further comprising:
    reactuating the second one of the plurality of non-positive shifting elements to the engaged configuration after said step of commanding; and
    actuating a fourth one of the plurality of non-positive shifting elements to the engaged configuration after said step of commanding.

6. The method of claim 5, wherein the automatic transmission is in a reverse gearing after said step of reactuating and said step of actuating the fourth one of the plurality of non-positive shifting elements.

7. The method of claim 1, wherein at least one of a sensor or a controller area network bus of the automatic transmission is inoperative in the limp mode.

8. A method for operating a nine-speed automatic transmission in a limp mode, the nine-speed automatic transmission having a plurality of non-positive shifting elements and a pair of positive shifting elements, the method comprising:
- actuating a first non-positive element of the plurality of non-positive shifting elements to an engaged configuration;
- actuating a second non-positive element of the plurality of non-positive shifting elements to the engaged configuration, said step of actuating the second non-positive element being initiated after a start of said step of actuating the first non-positive element, a first positive element of the pair of positive shifting elements being substantially synchronized after said step of actuating the second non-positive element; and
- commanding the first positive element to actuate from a disengaged configuration to the engaged configuration after said step of actuating the second non-positive element,
- wherein a time period, $\Delta t$, is provided between a start of said step of actuating the second non-positive element and the start of said step of actuating the first non-positive element, the time period $\Delta t$ selected such that a speed differential of the first positive element is reduced during said step of actuating the second non-positive element.

9. The method of claim 8, wherein the time period $\Delta t$ is selected in order to minimize the speed differential of the first positive element during said step of actuating the second non-positive element.

10. The method of claim 9, further comprising opening the first non-positive element and the second non-positive element after said step of commanding.

11. The method of claim 10, further comprising actuating a third non-positive element of the plurality of non-positive shifting elements to the engaged configuration after said step of commanding.

12. The method of claim 11, wherein a time interval, $\Delta i$, is provided between a start of said step of actuating the third non-positive element and said step of commanding, the first positive element actuating from the disengaged configuration to the engaged configuration during the time interval $\Delta i$.

13. The method of claim 11, wherein the automatic transmission is in a forward gearing after said step of actuating the third non-positive element.

14. The method of claim 10, further comprising:
- reactuating the second non-positive element to the engaged configuration after said step of commanding; and
- actuating a fourth non-positive element of the plurality of non-positive shifting elements to the engaged configuration after said step of commanding.

15. The method of claim 14, wherein the automatic transmission is in a reverse gearing after said step of reactuating and said step of actuating the fourth non-positive element.

16. The method of claim 8, wherein at least one of a sensor or a controller area network bus of the automatic transmission is inoperative in the limp mode.

* * * * *